Patented Oct. 27, 1936

2,058,821

UNITED STATES PATENT OFFICE 2,058,821

WATERPROOFING COMPOSITION

Edward B. Peck, Mannheim, Germany, assignor to Standard Oil Development Company, a corporation of Delaware No Drawing. Application December 27, 1933, Serial No. 704,142

5 Claims. (Cl. 91—68)

This invention relates to improved means for waterproofing concrete, cement and similar surfaces, and applies more particularly to the use as waterproofing agents of organic compositions permitting the formation of water insoluble calcium compounds with constituents of the surfaces, thereby firmly bonding the composition to the surface desired to be waterproofed.

Concrete and cement surfaces ordinarily contain small amounts of free lime which slowly leaches out and leaves a porous structure readily permeable to water. It has now been found that the application to such surfaces of compositions such as organic acids of high molecular weight, which are capable of forming water insoluble calcium compounds, is a very effective means for waterproofing these surfaces. Particularly desirable waterproofing substances are the sulphonic acids and ammonium sulfonates of high molecular weight organic compounds such as those obtained by the sulfuric acid treatment of petroleum oils, tar oils, and by sulfonating aromatic compounds such as naphthalene and derivatives thereof. It is preferable that the sulfonic acids and ammonium sulfonates used should be substantially free of tarry and pitchy matter and of substantial amounts of free mineral acids. The presence of compounds of strong bases, such as sodium and potassium, is also preferably avoided.

The following example illustrates one method for preparing waterproofing compositions suitable for the herein described invention.

Example 1

A heavy viscous petroleum oil fraction suitable for the preparation of lubricating oils and white oils is vigorously agitated with about 10% by volume of a 15% strength fuming sulfuric acid. The resulting sludge is allowed to settle and is separately drawn off. The oil is then subjected to vigorous agitation with a second batch of fresh acid of similar strength in an amount about 5% by volume of the original oil. The temperature of the oil and acid mixture during these treatments is maintained preferably below about 100° F., say from 60 to 100° F. The mixture is then allowed to stand and the treated oil separates as a top layer and is withdrawn. The acid sludge is then diluted with about 30% by volume of water and allowed to stand, whereupon an aqueous bottom layer of about 40% strength aqueous sulfuric acid separates and is withdrawn. The remaining sludge is then subjected to one or more additional washes with water until it contains less than about 20% free sulfuric acid. This sludge consists mainly of sulfonic acids with some free sulfuric acid and with very small amounts of polymerized tarry and resinous constituents. It may be used directly, or preferably in an aqueous solution containing about 10 to 30% solids, as a waterproofing composition for application to cement or concrete surfaces.

Example 2

Aqua-ammonia is added with agitation to washed acid sludge obtained as described in Example 1 until the color changes from green to brown. Water is then added to adjust the concentration of the resulting solution to 50% solids. This solution is applied to the inside walls of a concrete cellar and forms such a firm bond with the walls that the diffusion of water therethru from the ground outside the cellar is completely prevented. The liberation of ammonia for a few days following the application of this waterproofing composition is an indication of the metathetical reaction occurring between the ammonium sulfonates and the alkaline constituents of the concrete.

Improved waterproofing compositions of lighter color and even greater stability may be obtained by using purified sulfonic acids and sulfonates, which have been obtained by various known methods for use as fat splitting agents, emulsion breakers, wetting agents, detergents and dispersive aids. For example, purified sodium sulfonates may be obtained from neutralized acid sludge by extraction with low molecular weight alcohols, such as iso-propyl alcohol. Purified sulfonic acids may be readily obtained by treating such sulfonates with dilute sulfuric acid.

"Mahogany" or oil soluble sulfonic acids and ammonium sulfonates thereof may also be used according to this invention in suitable solvents such as light naphthas and also in aqueous emulsions or dispersions, but are generally less desirable for this use than the "green" or water soluble sulfonic acids described above.

The sulfonic acids and ammonium salts thereof may also be applied in admixture with other waterproofing and surface coating compositions generally such as naphtha solutions of waxes, drying oils, suitable resins, and the like, and will be found to increase the firmness of the bond between the coating composition and the concrete or cement surface to which it is applied. The ammonium salts are generally less desirable for this type of application because the ammonia liberated may tend to destroy the film.

Alkali sulfonates, such as sodium or potassium sulfonates, are not suitable for the present invention for when such sulfonates are applied to cement or concrete surfaces, a metathetical reaction occurs in which calcium sulfonates and free alkali are formed. The presence of such free alkali is highly objectionable as it greatly weakens the cement or concrete structure and causes crumbling and rapid deterioration thereof.

Aqueous ammonium sulfonate or sulfonic acid solutions containing 20 to 50% of the sulfonic compounds are preferably applied with a brush over the surface of the concrete or cement surface to be treated, although more dilute or more concentrated solutions may be used. Various other ingredients, such as pigments, emulsified asphalt, fillers, resins, dyes, inorganic salts, and the like may be added to the solution or dispersion before the material is applied to the surface.

The petroleum sludge may be subjected to a preliminary precipitation by first treating the washed sludge or the sodium salts thereof with a heavy metal base such as lime, barium carbonate, calcium carbonate, magnesium oxide, or the like, whereupon a precipitation of the water insoluble heavy metal sulfonates occurs, and these may be separated from the corresponding water soluble salts. The insoluble salts so formed may be employed as an ingredient in coating compositions, although it is preferable to convert them to the corresponding ammonium salts for this purpose.

It is also possible to treat the washed sludge or the crude ammonium sulfonates with various solvents such as alcohols, hydrocarbons, liquid ammonia, and the like, prior to application, in order to remove undesirable constituents. Treatment of the sulfonic acids or salts with various reagents such as chlorine, hydrogen chloride, nitric acid, and the like may also be carried out as a preliminary step.

This invention is not to be limited to any theoretical explanations or examples which have been presented herein solely for purpose of illustration, but is limited only by the following claims in which it is desired to claim all novelty insofar as the prior art permits.

I claim:

1. Method of waterproofing cement, concrete and similar surfaces which comprises coating the same with a liquid coating composition comprising water soluble sulfonic compounds derived from petroleum and selected from the group consisting of sulfonic acids and ammonium salts thereof, said compounds being capable of forming water insoluble reaction products with constituents present in the surface to be treated.

2. Method according to claim 1 in which the sulfonic compounds used are derived from acid sludge obtained by treating heavy viscous petroleum oil with fuming sulfuric acid.

3. Method according to claim 1 in which the sulfonic compounds used are prepared by treating heavy petroleum oil with fuming sulfuric acid, subjecting the resultant acid sludge to a treatment to cause precipitation of water insoluble sulfonates and separating the latter and converting them to the corresponding ammonium salts.

4. Method of waterproofing cement and concrete surfaces comprising coating the same with an aqueous solution of a soluble sulfonic compound selected from the group consisting of sulfonic acids and ammonium salts thereof derived from petroleum acid sludge and substantially free of tarry matter and free sulfuric acid.

5. Method according to claim 4 in which the coating solution contains 20 to 50% ammonium sulfonates from acid treatment of petroleum oil.

EDWARD B. PECK.